United States Patent [19]

Jubin

[11] Patent Number: 4,925,441
[45] Date of Patent: May 15, 1990

[54] CENTRIFUGAL CONTACTOR MODIFIED FOR END STAGE OPERATION IN A MULTISTAGE SYSTEM

[75] Inventor: Robert T. Jubin, Powell, Tenn.

[73] Assignee: The United States of America as represented by the United States Department of Energy, Washington, D.C.

[21] Appl. No.: 365,636

[22] Filed: Jun. 13, 1989

[51] Int. Cl.$^5$ .............................................. B04B 5/00
[52] U.S. Cl. ....................................... 494/32; 494/35; 494/36
[58] Field of Search ...................... 494/31, 32, 35, 36, 494/60, 62, 63; 210/781, 782, 360.1

[56] References Cited

U.S. PATENT DOCUMENTS

| | | | |
|---|---|---|---|
| 2,510,781 | 6/1950 | Howard | 494/62 |
| 3,273,790 | 9/1966 | Dahlberg | 494/32 |
| 4,708,709 | 11/1987 | Zeller | 494/32 |
| 4,781,671 | 11/1988 | Pober | 494/32 |

OTHER PUBLICATIONS

Jennings, A. S., *A Miniature Centrifugal Contactor*, Engineering and Equipment, DP-680, TID-4500, 17th Ed., U.S. Government Printing Office, Mar. 1962.
Kishbaugh, A. A., *Performance of a Multi-Stage Centrifugal Contactor*, DP-841, TID-4500, 23rd Ed., U.S. Government Printing Office, Oct. 1963.
W. D. Burch et al., *Consolidated Fuel Reprocessing Program*, Progress Report for Period Oct. 1 to Dec. 1984, ORNL/TM-9513, U.S. Government Printing Office, Feb. 1985.
W. D. Burch et al., *Consolidated Fuel Reprocessing Program*, Progress Report for Period Oct. 1 to Dec. 1986, ORNL/TM-10359, U.S. Government Printing Office, Jun. 1987.
R. T. Jubin, *Preliminary Evaluation of Overflow Ports in a Four-Stage Experimental Centrifugal Solvent Extraction Contactor*, ORNL/TM-9878, U.S. Government Printing Office, May 1986.
S. P. Singh, *Operating Experience with Advanced Centrifugal Contactors in the Integrated Equipment Test Facility*, ORNL/TM-10565, U.S. Government Printing Office, Dec. 1987.
R. T. Jubin et al., *Developments in Centrifugal Contactor Technology*, ORNL/TM-10768, U.S. Government Printing Office, Sept. 1988.

*Primary Examiner*—Robert W. Jenkins
*Attorney, Agent, or Firm*—Stephen D. Hamel; William R. Moser; Richard E. Constant

[57] ABSTRACT

A cascade formed of a plurality of centrifugal contactors useful for countercurrent solvent extraction processes such as utilizable for the reprocessing of nuclear reactor fuels is modified to permit operation in the event one or both end stages of the cascade become inoperative. Weir assemblies are connected to each of the two end stages by suitable conduits for separating liquids discharged from an inoperative end stage based upon the weight of the liquid phases uses in the solvent extraction process. The weir assembly at one end stage is constructed to separate and discharge the heaviest liquid phase while the weir assembly at the other end stage is constructed to separate and discharge the lightest liquid phase. These weir assemblies function to keep the liquid discharge from an inoperative end stages on the same weight phase a would occur from an operating end stage.

10 Claims, 4 Drawing Sheets

Fig.1

CENTRIFUGAL CONTACTOR MODIFIED FOR END STAGE OPERATION IN A MULTISTAGE SYSTEM

BACKGROUND OF THE INVENTION

The present invention relates generally to centrifugal contactors in a multistage or cascade system for separating liquids of different weight phases, and more particularly to the modification of the centrifugal contactors functioning as the end stages in the cascade for enabling the cascade to continue operation when an end stage becomes inoperative. This invention was made as a result of work under contract DE-AC05-84OR21400 between Martin Marietta Energy Systems, Inc., and the U.S. Department of Energy.

Centrifugal contactors operating in a cascade or multistage arrangement have been found to provide a highly satisfactory system for separating liquids from one another based on different weight phases. The use of centrifugal contactors is particularly advantageous in operations where short residence times, small inventories and high separating force fields are beneficial. Typical employment of centrifugal contactors where success has been demonstrated is in areas including pharmaceuticals, processing of lubricating oils, treatment of liquid wastes and nuclear reactor fuel reprocessing. Centrifugal contactors are particularly desirable for the reprocessing of nuclear reactor fuels since in such instances short residences times, small inventories and high separating force fields are of high priority due to the high radiation fields in the process liquids as generated by fission products therein which damage the extraction solvents over extended periods of contact. Also, with small inventories criticality concerns with respect to the fissionable material in the process liquids are minimized and emulsification problems are significantly controlled by the large separating force applied to the process liquids in the centrifugal contactor.

In nuclear reactor fuel reprocessing operations, the centrifugal contactors can be utilized to separate uranium and plutonium values from fission products and other actinides undesirable for use nuclear reactor fuels. Typically, in a nuclear fuel reprocessing operation using centrifugal contactors, a cascade of several, i.e., about four to twenty four, centrifugal contactors are employed with each centrifugal contactor comprising a housing containing a vertically oriented rotor. The process liquids comprise a heavy solvent or organic phase and a lighter aqueous phase which are introduced into the centrifugal contactors through separate conduits or inlets which are in registry with a mixing zone before the liquid mixture enters the rotor where centrifugal force is utilized to separate the heavy phase from the lighter phase by forcing the heavy phase to flow outwardly away from the rotational axis of the rotor and displace the lighter phase closer to the rotational axis of the rotor. These process streams are then individually collected at the upper end of the rotor at a location adjacent to the outer periphery thereof for the heavier liquid phase and at a location adjacent to the rotational axis of the rotor for the lighter liquid phase. During this introduction of the process liquids into the mixing zone, the two phases are introduced tangentially into a mixing zone to enhance mixing and mass transfer between the liquid phases so that a good mixture of the liquid phases enter the rotor through an opening in the base thereof due to pressure gradients developed by the rotation of the rotor. In nuclear reactor fuel reprocessing systems, the centrifugal contactors, which may employ the improvement provided by the present invention, are disposed in a multistage or cascade arrangement with each contactor having a diameter of approximately 5.5 centimeters. A detailed description of the use of centrifugal contactors in a multistage nuclear reactor fuel reprocessing operation is set forth in a report entitled *Developments in Centrifugal Contactor Technology*, R. T. Jubin et al, ORNL/TM-10768, U.S. Government Printing Office, September, 1988. This report is incorporated herein by reference.

While the present invention is particularly useful in centrifugal contactors such as those envisioned for the use of reprocessing nuclear fuels, it is to be understood that the present invention may be utilized in centrifugal contactors employed for the separation of other liquids such as those generally mentioned above.

It has been found that while the use of centrifugal contactors in a multistage system or cascade are desirable for continuous counter-current liquid extraction processes problems occur during the processing of liquids in the 5.5-cm-diameter contactors which are deleterious to the operation of the cascade. More specifically, if a centrifugal contactor at any location or stage within the cascade becomes inoperative such as caused by the failure of a drive motor, the entire cascade must be shut down. If the operation of the cascade was not halted the flow of process liquids, such as the aqueous and organic phases in a nuclear reactor fuel reprocessing operation, continues from adjacent stages into the inoperative stage until the rising liquid in the inoperative stage reaches the organic collector ring. At this time, the liquid in the inoperative stage will flow back flow into the process-liquid feed lines from the adjacent stages. This back flow affects the feed of the organic phase from the adjacent stage as well as the organic collector ring in the adjacent stage from which the organic stream is normally delivered to the inoperative stage since the organic phase collector rings are at the same elevation. Further problems occur in that the aqueous-organic liquid interface rises above the feed points in the inoperative stage so that the organic phase will flow as intended to the adjacent stage while the aqueous phase which is the heavier phase will tend to flow up the organic feed line. The interface formed between the aqueous and organic liquids in the inoperative stage rises so that the organic phase feed line becomes blocked with the aqueous phase liquid so as to interfere with the discharge of the organic liquid from the operating adjacent stage so as to eventually cause the flooding of all stages down stream of the inoperative stage.

Efforts to overcome this significant problem due to the deleterious contamination of the process liquids when one of the centrifugal contactors in a multistage operation became inoperative and which would also allow for continued operation with one inoperative stage have been successful, but only when the inoperative stage is not an end stage. The term "end stage" as used herein is either the stage at one end of the cascade from which the aqueous liquid phase is discharged for further processing or the stage of the cascade system from which the organic phase liquid is discharged for subsequent. It was previously found that this problem with respect to an internally located stage becoming inoperative could be overcome by installing horizontally oriented overflow ports below the organic collector rings and above the feed points with these overflow ports serially coupling the centrifugal contactors in the cascade. The overflow ports provide for the overflow of both aqueous and organic phases from the inoperative stage into the mixing volume in the operating adjacent stages at a location below the collector rings so as to allow for essentially complete flushing of the organic from the system since the interface of the aqueous and organic phases would occur at an evaluation in the mixing volume at a level common with the overflow ports. The initial flow of liquid through these ports from an inoperative stage would be the organic phase since there would be an inorganic layer of finite thickness over the rising heavier aqueous phase. However, when the organic layer becomes displaced, the overflow of liquid through the overflow ports would consist of both aqueous and organic phases in essentially the same proportions as the feed stream introduced into the inoperative centrifugal contactor. Thus, with equal volumes of process liquid flowing to each adjacent stage with the phase relationship in each stage being equal to that entering the inoperative stage the operation of the cascade could continue without being shut down as heretofore required.

While the use of the overflow ports provided a satisfactory solution to the failure or inoperativeness of internal stages of a multistage centrifugal contactor arrangement or cascade, the overflow ports were not useful when the inoperative stage was an end stage in the cascade. It was found that when either of the end stages became inoperative, the entire cascade operation had to be terminated since both the aqueous and organic phases would be discharged from the inoperative end stage through the conduit normally utilized for either the aqueous product with one end stage or the organic product with the other end stage. This mixing of the liquid phases in the discharge lines causes deleterious contamination of the product stream. When either end stage failed, process liquids in the inoperative end stage would rise until they back flow into the adjacent centrifugal contactor through the overflow port. This back flow would allow for the operation of the internal centrifugal contactors in the normal manner but a significant quantity of the contaminated liquid would be discharged from the cascade through the inoperative end stage so as to render unwarranted any further operation of the cascade.

SUMMARY OF THE INVENTION

It is a primary aim or objective of the present invention to provide the centrifugal contactors forming the end stages of a multistage centrifugal contactor system or cascade with a mechanism by which an end stage may become inoperative without requiring the cascade to be shut down as previously required.

It is another object of the present invention to provide end stage from which the aqueous phase is discharged from the cascade with a weir assembly for separating the organic phase from the aqueous phase so as to allow the aqueous phase to be discharged from the inoperative end stage of the cascade without being contaminated with organic phase liquid.

It is a further object of the present invention to provide the centrifugal contactor forming the end stage from which the organic phase is discharged with a weir assembly whereby the aqueous phase is separated from the organic phase in order to allow the organic phase to be discharged from the cascade when the end stage becomes inoperative.

Generally, the present invention is directed to the modification of the centrifugal contactor which is to provide an end stage of a plurality of serially connected stages of centrifugal contactors forming a cascade. The centrifugal contactor like the other stages in the cascade compromises housing means having inner wall portions which define an elongated vertically extending cylindrical cavity. An elongated cylindrical rotor means having openings therein at an upper end and at a lower end thereof is disposed in the cavity with outer vertical wall portions on the rotor means being radially inwardly spaced from the inner wall portions of the housing means for defining an elongated, vertically oriented annular liquid mixing volume. Inlet passageway means penetrate the housing and are in registry with the annular mixing volume at a location intermediate upper and lower ends thereof for introducing liquid with multiple phases of different relative densities into the annular mixing volume for the mixing of the different phase liquids for subsequent reception in the rotor means through an opening in the lower end thereof.

The modification to the end stage centrifugal contactor envisioned by the present invention comprises further housing means which have wall portions defining chamber means within the further housing means. Further passageway means are in registry with the annular mixing volume and the chamber means in the further housing means for conveying liquid from the annular mixing volume to the chamber means in the further housing means. Weir means are disposed in the chamber means in the further housing for separating phases of the liquid received in the chamber means in the further housing means according to the relative density of the liquid phases. Conduit means are in registry with the chamber means in the further housing means for conveying therefrom liquid separated by said weir means. Still further passageway means are in registry with the annular mixing volume for conveying liquid therefrom that is not introduced into the further housing means.

When the centrifugal contactor provides the end stage of the cascade from which the aqueous phase or the heavier phase of the liquids is to be discharged from the cascade, the modification of the present invention is provided by the coupling the above-mentioned further passageway means which are in registry with the annular mixing volume of the centrifugal contactor and the chamber means in the further housing means with the annular mixing volume at a location overlying the location where the inlet passageway means are in registry with the annular mixing volume. Weir means are provided within the further housing means by vertically extending partition means or wall means which are affixed to the top wall portions of the further housing means defining the chamber means and extend downwardly into the chamber means to a location spaced from and adjacent to the base of the chamber means defined by wall portions of the further housing means. The weir means define two compartments, one on either side of the partition means which are connected by a passageway located between the bottom of the partition means and the base of the further housing means. With this arrangement the aqueous and organic liquids are discharged from the inoperative end stage into one compartment on one side of the vertical partition means where the heavier or the aqueous phase separates from the organic phase and descends into the compartment and passes through the passageway into the compartment on the other side of the vertical partition means. With such an arrangement the aqueous phase is effectively separated from the organic phase and is subsequently discharged from the further housing means through a suitable discharge port and conduit means. In addition to the further passageway means coupling the chamber means in the further housing means to the annular volume, the still further passageway means mentioned above, which are in registry with the annular mixing volume are positioned in the same horizontal plane as the further passageway means whereby a mixture of the aqueous and organic phases is conveyed to an centrifugal contactor of an adjacent stage in much the same manner as the overflow ports described above.

When the centrifugal contactor provides the end stage of the cascade from which the organic stage is discharged, it is modified in a manner differently from the modification for the end stage for the discharge of the aqueous phase. In this embodiment the partition means providing the weir means in the further housing means is secured to the bottom or base of the further housing means and terminates at a location adjacent to and space from the top wall portions of the further housing means defining the chamber means to divide the chamber means in the further housing means into compartments interconnected by passageway means located between the top of the partition and the top of the further housing means. The further passageway means introduces the flow of organic and aqueous from the inoperative end stage into a compartment on one side of the vertical partition means where the heavier or aqueous phase separates from the organic phase and settles towards the bottom of the compartment while the lighter organic phase will flow through the passageway way means into the compartment on the opposite side of the vertical partition means for subsequent discharge. The heavier phase in turn sinks to the bottom of the compartment in the further housing means is returned to the annular mixing volume in the inoperative end stage through a still further conduit means which connects the annular mixing volume to the first mentioned compartment in the further housing means. An additional modification is also provided in that the aforementioned still further passageway means which are in registry with the annular mixing volume for conveying liquid therefrom comprise slanted or angled passageway means which are in registry with the annular mixing volume at a location therein underlying the location where the inlet passageway means are in registry with the annular mixing volume in a horizontal plane in common with the still further conduit means. The upper end of the slanted passageway means are in registry with an annular mixing volume of an adjacent centrifugal contactor at a location in a horizontal plane in common with the aforementioned further passageway means which are disposed at a location overlying the inlet passageway means. The slanted passageway means provide for the discharge of the heavier of aqueous from the annular mixing volume from the inoperative stage into the annular mixing volume of an adjacent centrifugal contactor for mixture with the process liquids therein.

Other and further objects of the present invention will become obvious upon an understanding of the illustrative embodiments about to be described or will be are indicated in the appended claims and various advantages not referred to herein will occur to one skilled in the art upon employment of the invention in practice.

DESCRIPTION OF THE DRAWINGS

The weir mechanisms in FIGS. 3 and 4 are shown rotated 90 degrees from their actual position in the FIG. 2 arrangement for ease of illustration.

Preferred embodiments of the present invention have been chosen for the purpose of illustration and description. The embodiments illustrated are not intended to be exhaustive or to limit the invention to the precise forms disclosed. These embodiments are chosen and described in order to best explain the principles of the invention and their application in practical use so as to enable others skilled in the art to best utilize the invention in various embodiments and modifications as are best adapted to the particular use contemplated.

DETAILED DESCRIPTION OF THE INVENTION

Figure 1:
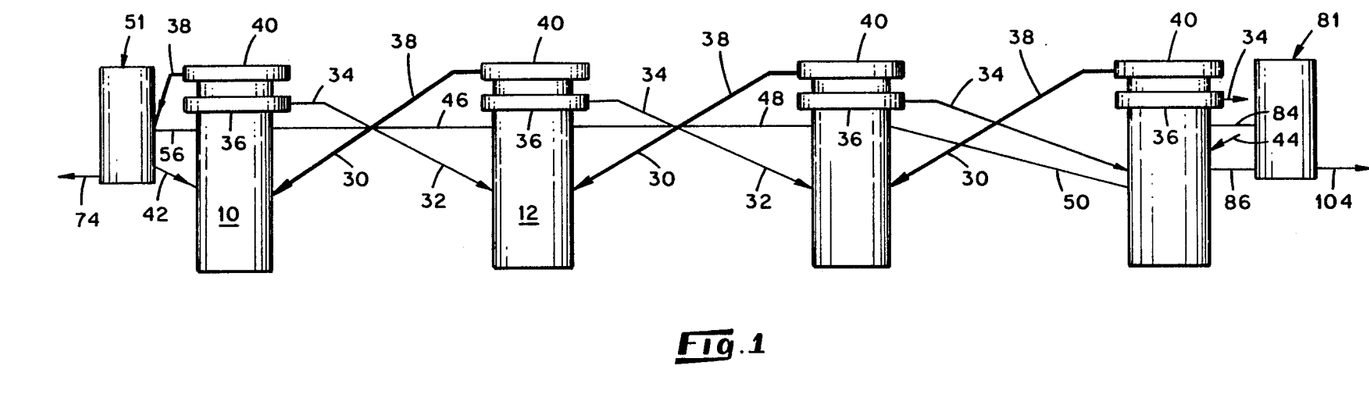
FIG. 1 is a schematic flow diagram illustrating a cascade formed of a plurality of serially connected centrifugal contactors with overflow ports and includes end stages modified in accordance with the present invention.
Figure 2:
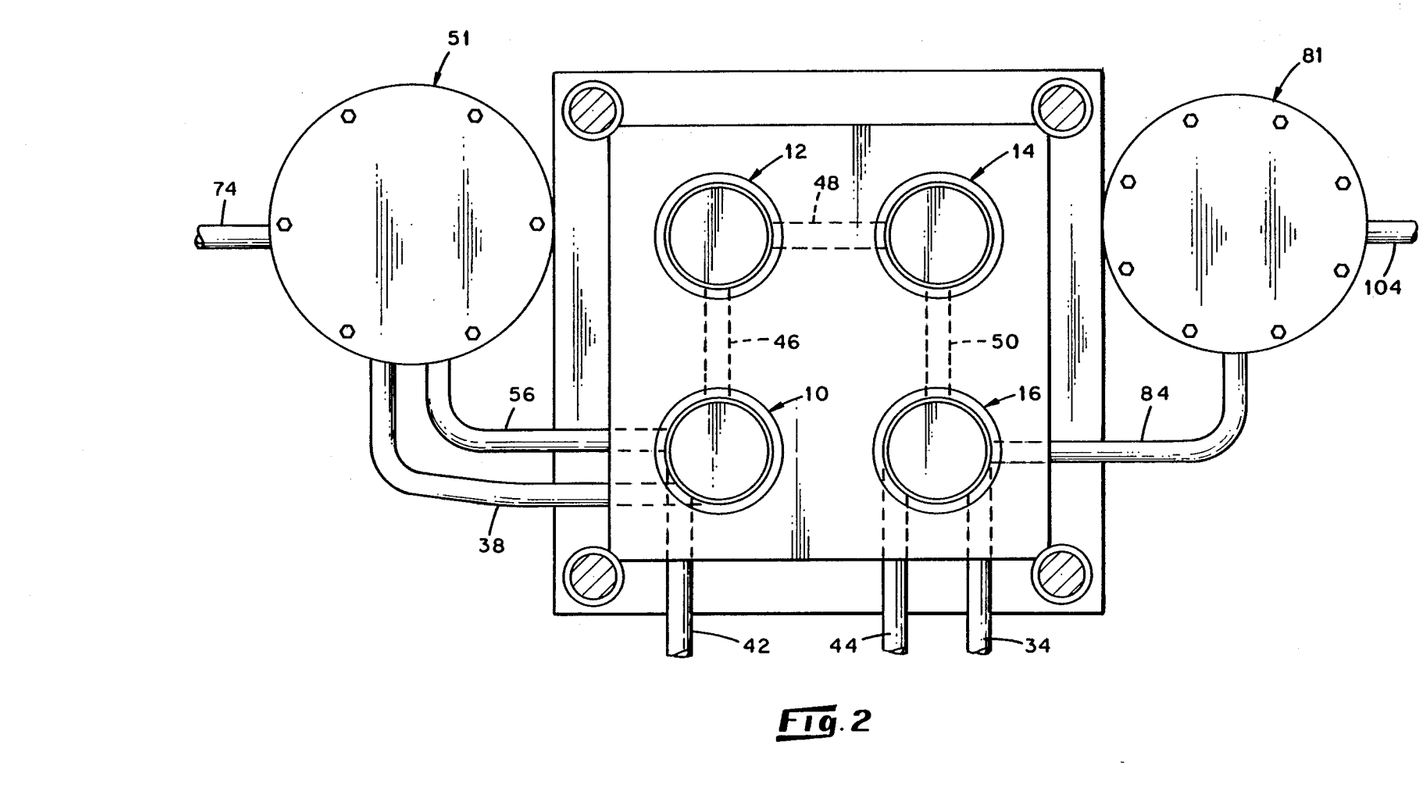
FIG. 2 is a plan view showing in greater detail the centrifugal contactors of the FIG. 1 embodiment arranged in a single containment structure with the end stages provided with the liquid phase separating mechanisms of the present invention.
Figure 3:
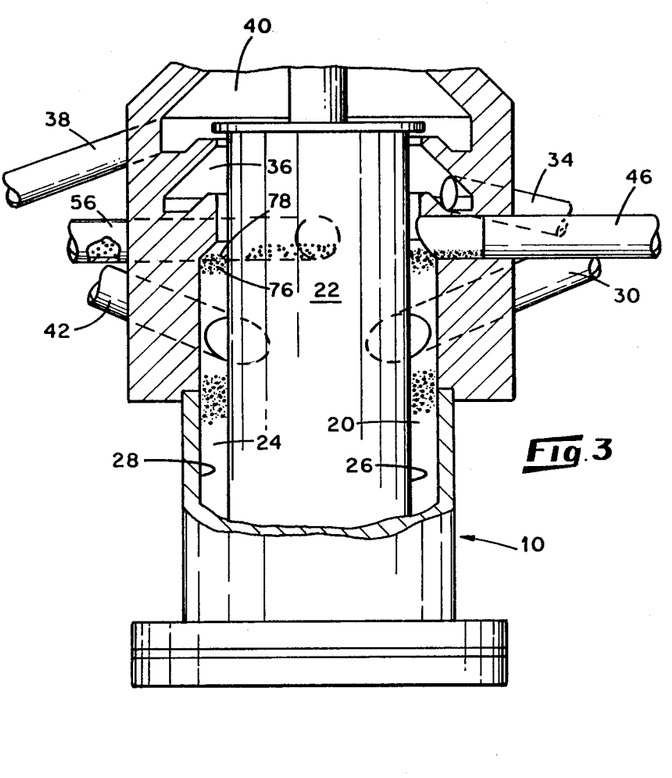
FIG. 3 is a sectional elevational view showing details of the end stage through which the aqueous phase is discharged from the cascade and the liquid phase separating mechanism of the present invention.
Figure 4:
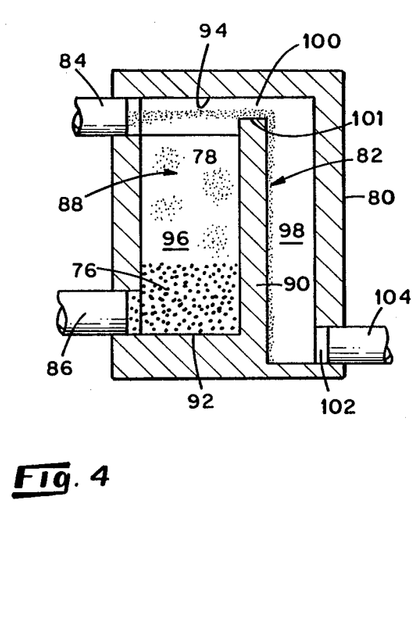
FIG. 4 is a sectional elevational view showing details of the end stage and the liquid phase separating mechanism for this end stage in the cascade from which the organic phase is discharged.

In the accompanying drawings, FIGS. 1 and 2 illustrate a cascade formed of four centrifugal contactors which are serially interconnected for countercurrent flow of the aqueous and organic phases utilized in a Redox-type reprocessing operation for recovering uranium and plutonium values from spent nuclear reactor fuels. However, it is to be understood that the cascade can be formed of any desired number of centrifugal contactors wherein the separation of a desired liquid phases of different densities for any purpose such a generally mentioned above may be achieved. The single centrifugal contactors illustrated in FIGS. 3 and 4 are shown as the end stages of the multistage or cascade arrangement as illustrated in FIGS. 1 and 2 with these stages being interconnected with internally located stages for countercurrent flow of the aqueous and organic liquid phases. While this description is primarily directed to the use of the 5.5 centimeter centrifugal contactors in a cascade assembly, it is to be understood that the end stage modifications of the present invention can be readily utilized with centrifugal contactors of other dimensions to overcome or significantly minimize the problems associated with inoperative end stages in a cascade as described herein.

As generally indicated in FIGS. 1 and 2 the centrifugal contactors shown at 10, 12, 14, and 16 for the purpose of this description are of a size having a diameter of approximately 5.5 centimeters and are coupled together by suitable piping for forming the cascade. Each centrifugal contactor such as generally shown at 10 and more specifically described in the aforementioned report compromises a housing 18 which is vertically oriented and contains a cylindrical vertically oriented cavity 20 which is utilized to house an elongated vertically standing cylindrical rotor 22 driven by a suitable drive means (not shown). The outer diameter of the rotor 22 is less than that of the inner diameter of the housing 18 so as to define an elongated, vertically oriented annulus which provides a mixing zone or volume 24 for the process liquids. This annular mixing volume 24 is defined by the outer walls 26 of the rotor 22 and the inner walls 28 of the housing 18.

The process liquids such as the aqueous phase and the organic phase in a nuclear reactor fuel reprocessing operation as introduced into the housing 18 through tangentially oriented inlets which are in registry with the annular mixing volume 24 at a location intermediate the upper and lower ends of the mixing volume as generally shown in FIG. 1 and more specifically shown in FIGS. 3 and 4. The process liquids inlets for the cascade stages are disposed in an arrangement useful for multistage nuclear fuel reprocessing with the inlet 30 in FIG. 1 shown as the inter-stage inlet for the aqueous phase in stages 10, 12 and 14 while inlet 32 is shown as the inlet for the organic phase in stages 12, 14 and 16. Each stage of the cascade contactors is provided with a similar arrangement of tangentially oriented inlets for introducing the process liquid into the annular mixing volume 24. The mixing and mass transfer between the process liquids in the annular mixing volume is primarily achieved by the shear forces induced in the liquids by the spinning rotor. This mixing is aided by the spiral flow of the process liquids in the annular mixing volume 24 as provided by the tangentially oriented inlets. These mixed liquids enter the rotor 22 through an opening in the base thereof (not shown) and are centrifugally separated within the rotor according to the weight phase by the rotation of the rotor 22. The lighter phase in the liquid mixture, which would be the organic phase in a nuclear reactor fuel reprocessing operation, is removed from the rotor 22 to a radially extending conduit or passageway 34 which is in registry with the central area of the rotor 22 at the top end thereof and a plenum or collection ring 36. This discharge conduit 34 becomes the inlet conduit corresponding to inlet 32 in centrifugal contactors 12, 14 and 16 for the organic phase in the adjacent centrifugal contactor in the serially coupled cascade of contactors as depicted by centrifugal contactor 12 in FIGS. 1 and 2. The heavier phase in the liquid mixture, which would be the aqueous phase in a nuclear reactor fuel reprocessing operation, is removed from the rotor opening at the top end thereof through a conduit or passageway 38 which is in registry with the rotor and a plenum or collector ring 40. Like the discharge conduit 34 for the organic phase the discharge conduit 38 in the centrifugal contactor 10 would be the inlet conduit corresponding to conduit 30 for the aqueous phase in the serially aligned centrifugal contactors 14, 12 and 10. In the centrifugal contactor arrangement illustrated in the drawings the discharge conduit 38 for centrifugal contactor 10 is the product aqueous phase that is removed from the cascade for subsequent processing. Also, for the purpose of illustration the inlet and discharge conduits for the aqueous phase and the organic phase in each contactor is provided with reference numerals similar to those use in the description of centrifugal contactors 10 and 16. The discharge conduit 34 in registry with the collector ring 36 in centrifugal contactor 16 is for the product organic phase which is removed from the cascade for subsequent processing.

As shown in the drawings, centrifugal contactors 10 and 16 are the end stages in the cascade and the organic and aqueous liquid phases to be subjected to the centrifugal separation in the cascade are introduced into the cascade through suitable conduits in registry with the annular mixing volumes 24 in these contactors. In the FIGS. 1 and 2 arrangement the contactor 10 is the final or end stage in the cascade for the aqueous phase so that the organic phase is introduced into the cascade through this centrifugal contactor through conduit 42 in registry with the mixing volume 24 of the centrifugal contactor 10. Conversely, the centrifugal contactor 16 is the final or end stage in the cascade for the organic phase so that the aqueous phase to be utilized in the cascade is fed into the cascade through conduit 44 which is in registry with the annular mixing volume 24 in centrifugal contactor 16.

As illustrated in FIGS. 1 and 2 the centrifugal contactors 10, 12, 14, and 16 are provided with overflow passageways or conduits which enable either of the internal centrifugal contactors 12 or 14 to become inoperative without necessitating the shutdown of the cascade as described above. In FIGS. 1 and 2, the centrifugal contactor 12 is in registry with or connected to centrifugal contactor 10 and centrifugal contactor 14 by overflow conduits 46 and 48, respectively. Centrifugal contactor 14 is also connected to centrifugal contactor 16 by overflow of conduit 50. The overflow conduits 46 and 48 between the internal stages of centrifugal contactors are disposed in a common horizontal plane in registry with the mixing volume of each centrifugal contactor at a common location which is above the location of the inlet lines 30, 32, 42, and 44 used to convey the aqueous and organic liquids into the annular mixing volumes. The overflow line 50 between centrifugal contactor 14 and centrifugal contactor 16 is in registry with the annular mixing volume 24 in centrifugal contactor 14 at the same level as the overflow lines 46 and 48 between centrifugal contactors 10, 12 and 14 and then extends downwardly to connect with the mixing volume 24 in contactor 16 at a location underlying the inlets for the process liquids from lines 30 and 44. This overflow conduit 50 is disposed at an angle between centrifugal contactors 14 and 16 for the purpose of facilitating the separation of the liquid phases by the liquid phase separating mechanism of the present invention as will be described in detail below.

In accordance with the present invention the cascade of four centrifugal contactors as depicted in FIGS. 1 and 2 is provided with a liquid phase separating mechanism at the centrifugal contactor 10 from which the aqueous phase is discharged from the cascade and also with a liquid phase separating mechanism at the centrifugal contactor 16 from which the organic phase is discharged from the cascade for enabling the cascade to remain in an operative mode in the event either end stage or, in an extreme case, both end stages of the cascade become inoperable.

As mentioned above and with reference to FIGS. 1-3, the centrifugal contactor 10 represents the end stage of the cascade from which the product aqueous phase is discharged through line 38. This end stage 10 is coupled to the liquid phase separating mechanism 51 which is provided by a housing 52 containing a weir assembly 54. The housing is coupled to the annular mixing volume in stage 10 by a conduit 56 which is disposed in the same horizontal plane as the overflow conduits 46 and 48. As shown in FIGS. 1 and 3, the liquid phase separating mechanism 51 has been rotated 90 degrees from its actual location for the ease of illustration. However, the specific location of this phase separating mechanism as well as the phase separating mechanism for end stage 16 is not critical.

Weir assembly 54 is disposed in the closed chamber or volume 58 in the housing 52 and is provided by a vertically extending wall or partition 60 which projects from the top 62 of the housing wall portions forming chamber 58 and terminates at a location adjacent to and spaced from the base 64 of the chamber as defined by wall portions of the housing. This partition 60 separates the chamber into two vertically oriented compartments 66 and 68 which are connected by a passageway 70 between the base 64 of the chamber and the bottom or end 71 of the partition 60 so as to provide for liquid communication between the compartments 60 and 68 as will be described below. The housing 52 and the closed volume or chamber 58 therein can be of any desired configuration such as circular, square, rectangular or any other suitable configuration wherein the vertically extending partition 60 can be placed to provide the compartments 66 on opposite sides of the partition 60 with these compartments being in registry with one another via the passageway 70 beneath the end 71 of the partition 60. This space defining the passageway between the bottom of the partition 60 and the base 64 should be sufficiently large to provide the passageway 70 with a flow capacity adequate to handle any discharge flow of the aqueous phase from the centrifugal contactor 10. The passageway 70 is in a horizontal plane below that of the inlets 32 and 34 and also below any interface formed between the aqueous and organic phases in the mixing volume 24 that would be present in the event the centrifugal contactor 10 became inoperative.

As shown in FIGS. 1-3, the discharge line 38 for the aqueous phase product from centrifugal contactor 10 is placed in registry with the compartment 66 in the chamber 58 of housing 52. This conduit 38 is preferably coupled to the compartment 66 at the same horizontal level as the overflow conduit 56. In normal operation of the centrifugal contactor 10 the aqueous phase discharges from the collector ring 40 through conduit 38 to fill the compartments 66 and 68 and subsequently passes from the housing through port 72 and discharge port 74. In the event centrifugal contactor 10 in some manner ceases to function and becomes inoperative, the flow of both the aqueous liquid 76 through line 38 and the organic liquid through line 34 is interrupted. With the process liquids still entering the mixing volume 24 through lines 30 and 42, the level of process liquids within the mixing volume 24 in end stage 10 continues to rise until the liquid reaches a level corresponding to that of the overflow ports 46 and 56. Inasmuch as no mixing occurs within a mixing volume in an inoperative stage the phases tend to separate within a mixing volume with the lighter organic phase being separated from the heavier phase by a rather distinct interface 79. With the liquid level reaching the overflow port 46 and conduit 56 the initial flow of process liquid through these overflow ports is the lighter or organic phase 78. The organic phase 78 entering the compartment 66 is prevented from passing into compartment 68 through the passageway 70 by the presence of the aqueous phase within the chamber 58 provided during the normal operation of the contactor 10. The organic phase 78 will initially flow from the inoperative centrifugal contactor 10 primarily through overflow port 46 to the annular mixing volume 24 in the adjacent stage 12 and overflow port 56 into compartment 68. After the initial flow of the organic phase 78 though overflow port 46 the interface 79 rises in the annular mixing volume 24 sufficiently so that the discharge into overflow port 46 and conduit 56 becomes a mixture of the organic and aqueous phases. Once the interface 79 becomes established at the elevation of the overflow ports further flow of the organic phase 78 into the liquid-full compartment 66 will be rejected and the organic phase 78 will then flow through overflow port 46. The aqueous phase 76 will then enter the compartment 66 through conduit 56 and settles through any organic liquid 78 in compartment 66 for flow through passageway 70 and subsequent discharge through conduit 74 via compartment 68 and port 72 so as to provide a discharge flow consisting essentially of the aqueous phase 76. With this liquid phase separating system, the cascade can continue to operate without the contamination of the aqueous phase being discharged through the end stage 10 when this stage fails.

Referring now to FIGS. 1, 2 and 4, the centrifugal contactor 16 represents the end stage of the cascade system of FIGS. 1 and 2 wherein the organic phase 78 is discharged from the cascade through line 34. This centrifugal contactor 16, like centrifugal contactor 10, is coupled to a liquid phase separating mechanism 81 which is constructed differently from the phase separating mechanism 51 at the centrifugal contactor 10. The liquid phase separating mechanism 81 used with centrifugal contactor 16 is provided by a housing 80 containing a weir assembly 82. This housing is coupled to the centrifugal contactor 16 by two conduits, the first of which is a conduit 84 disposed at the same horizontal level as the overflow conduits 46 and 48 while the other conduit 86 is in registry with the mixing volume 24 of centrifugal contactor 16 at a location below the inlet feed lines for the aqueous and organic phases as depicted by lines 32 and 44 in FIG. 4. The housing 80 is provided with an enclosed volume or chamber 88 in which a vertically oriented partition or wall 90 is secured to the base 92 of the housing and it vertically extends to a location adjacent to and spaced from the top 94 of the housing wall portions defining the chamber 88 so as to provide the chamber 88 with compartments 96 and 98 on opposite sides of the partition 90. These compartments 96 and 98 are interconnected by passageway 100 defined by the top end 101 of the partition 90 and the top 94 of the housing chamber 88. The uppermost end 101 of the partition 90 in the chamber 88 is at a horizontal level slightly higher than that of the bottom of the conduit 84 so as to assure that any mixed liquid phases entering the compartment 96 will be sufficiently separated by weight within the compartment 96 due to the higher elevation of the passageway before the organic phase 78 reaches and passes through the passageway 100 into compartment 98 and then through port 102 and discharge line 104.

If the centrifugal contactor 16 becomes inoperative the liquid level within the mixing volume 24 rises until it flows from the mixing volume into the compartment 96 of the housing 80 through conduits 84 and 86. Inasmuch as the initial flow of liquid from the mixing volume 24 is through line 86 both the aqueous phase 76 and the organic phase 78 will fill or essentially fill the compartment 96 before flow of the organic phase 78 begins through conduit 84 and thence through passageway 100 for discharge through conduit 104. When the aqueous phase 76 becomes mixed with the organic phase 78 which occurs after the end stage 16 is inoperative for a short period of time, the mixture of aqueous and organic phase enters the compartment 96. With the base of passageway 100 disposed at a location above the base of 84, the aqueous phase 76 entering compartment 96 will separate from the organic phase due to its greater density so that any flow of the liquid through the passageway 100 will consist essentially of the organic phase 78. The aqueous phase 76, in turn, settles within the compartment 96 and is returned to the annular mixing volume 24 in end stage 16 through the return line 86. The aqueous phase 76 within the mixing volume 24 including the aqueous phase returned from compartment 96 through line 86 is discharged from the annular mixing volume 24 through the slanted conduit 50 previously described. This conduit is in registry with the annular mixing volume 24 in end stage 16 at a location below the process liquid inlets 32 and 34 and the interface 79 in the annular mixing volume 24 at this location will be displaced upwardly through the conduit 50 for discharge into the mixing volume 24 in the adjacent stage 14. The exit end of conduit 50 in registry with the mixing volume 24 of end stage 16 is in a horizontal plane common to that of the overflow lines 48 and 46. Thus, with the aqueous phase 76 being continually being discharged from the annular mixing volume 24 in end stage 16 sufficient space will be maintained within the compartment 96 to assure that the compartment 96 will not be filled with the aqueous phase 76 which then be discharged along with the organic phase 78 through the passageway 100 and conduit 104. With this arrangement the end stage 16 can be rendered inoperative and yet the discharge of the organic phase liquid from the end stage 16 will not contain excess aqueous phase liquid as would occur without the without the modification to the end stage 16 provided by the present invention.

It will be seen that the present invention provides a significant improvement for the operation of centrifugal contactors in a cascade arrangement as used for the separation of liquid phases based on weight in the hereto for major concern due to an end stage becoming inoperative is no longer a problem which would require the shutdown of the cascade.

I claim:

1. A centrifugal contactor comprising housing means having inner wall portions defining an elongated vertically extending cylindrical cavity therein, elongated cylindrical rotor means disposed in said cavity with outer vertical wall portions thereon radially inwardly spaced from said inner wall portions of the housing for defining therewith a vertically oriented annular liquid mixing volume, inlet passageway means penetrating said housing and in registry with said annular mixing volume at a location intermediate upper and lower ends of said annular mixing volume means for introducing liquid with multiple phases of different relative densities into said annular mixing volume for subsequent reception in said rotor means through an opening in a lower end thereof, further housing means having wall portions defining chamber means therein, further passageway means in registry with said chamber means and said annular mixing volume at a location therein overlying the location where the inlet passageway means are in registry with the annular mixing volume for conveying liquid from said annular mixing volume to the chamber means, weir means disposed in the chamber means for separating phases of the liquid received in the chamber means according to the relative densities of the liquid phases, conduit means in registry with said chamber means for conveying therefrom liquid separated by said weir means, and still further passageway means in registry with said annular mixing volume for conveying liquid therefrom.

2. The centrifugal contactor claimed in claim 1, wherein said centrifugal contactor provides an end stage of a cascade formed by a plurality of serially connected centrifugal contactors disposed in a common horizontal plane, wherein each of said plurality of centrifugal contactors in the cascade apart from said end stage comprise housing means having inner wall portions defining an elongated vertically extending cylindrical cavity therein, elongated cylindrical rotor means disposed in said cavity with outer vertical wall portions thereon radially inwardly spaced from said inner wall portions of the housing for defining therewith a vertically oriented annular liquid mixing volume, inlet passageway means penetrating the housing means of said each centrifugal contactor and in registry with said annular mixing volume therein at a location intermediate upper and lower ends thereof for introducing liquid with multiple phases of different relative densities into the annular mixing volume for subsequent reception in the rotor means through the opening in the lower end thereof, wherein overflow conduit means are disposed between adjacent centrifugal contactors apart from said end stage with said overflow conduit means being in registry with the annular mixing volume in said each centrifugal contactor in a common horizontal plane at a location overlying the inlet passageway means, wherein said further passageway means are in a horizontal plane common with said overflow conduit means, and wherein said still further passageway means are in registry with the annular mixing volume of a centrifugal contactor disposed adjacent to and serially connected to said end stage at a location in the annular mixing volume of the adjacent centrifugal contactor in the same horizontal plane as said overflow conduit means.

3. A centrifugal contactor as claimed in claim 2, wherein the centrifugal contactor providing said end stage is the centrifugal contactor from which the heaviest phase of liquid of multiple phases of different relative densities is discharged from the cascade, conduit means are coupled to said end stage for conveying said heaviest phase from said end stage, wherein said further housing means has upper and lower wall portions respectively defining a top and base of said chamber means, wherein said weir means comprises vertically oriented partition means attached to said top of the chamber means and extending to a location spaced from and adjacent to the base of the chamber means for dividing the chamber means into two vertically oriented compartments and for providing a passageway between the compartments at a location adjacent to the base of the chamber means and in a horizontal plane lower than the location of registry of said inlet passageway means in the annular mixing volume of the end stage, wherein said further passageway means in registry with the chamber means are in the same horizontal plane as said overflow conduit means and are connected to one of said compartments at a location adjacent to the top of the chamber means, and wherein discharge conduit means are in registry with the other of said compartments at a location adjacent to the top of the chamber means for conveying liquid from said other compartment.

4. A centrifugal contactor as claimed in claim 3, wherein the conduit means for conveying the heaviest phase from said end stage are in registry with said one compartment of the chamber means at a location adjacent to the top of said chamber means.

5. A centrifugal contactor as claimed in claim 2, wherein the centrifugal contactor providing said end stage is the centrifugal contactor from which the lightest phase of liquid of multiple phases of different relative densities is discharged from the cascade, conduit means are coupled to said end stage for conveying said lightest phase from said end stage, wherein said further housing means has upper and lower wall portions respectively defining a top and base of said chamber means, wherein said weir means comprises vertically oriented partition means attached to said base of the chamber means and extending upwardly to a location spaced from and adjacent to the top of the chamber means for dividing the chamber means into two vertically oriented compartments and for providing a passageway between the compartments at a location adjacent to the top of the chamber means, said passageway having a base portion defined by the partition means disposed in a horizontal plane higher than a base portion in said overflow conduit means, wherein said further passageway means in registry with the chamber means are in the same horizontal plane as the overflow conduit means and are connected to one of said compartments at a location adjacent to the top of the chamber means, wherein further conduit means are in registry with said one compartment at a location adjacent to the base of the chamber means and the annular mixing volume in said end stage at a location intermediate the lower end of the annular mixing volume in said end stage and the location of registry of the inlet passageway means with the annular mixing volume, wherein discharge conduit means are in registry with the other of said compartments at a location adjacent to the base of the chamber means for conveying liquid from said other compartment, and wherein said still further passageway means are in registry with the annular mixing volume in said end stage at a location in a horizontal plane essentially common with the location of registry of said further conduit means and extend upwardly to said another centrifugal contactor at a location in the annular mixing volume of said another centrifugal contactor in a horizontal plane common with said overflow conduit means.

6. In a cascade formed of a plurality of serially connected centrifugal contactor stages with each of said plurality of centrifugal contactors comprising housing means having inner wall portions, defining an elongated vertically extending cylindrical cavity therein, elongated cylindrical rotor means disposed in said cavity with outer vertical wall portions thereon radially inwardly spaced from said inner wall portions of the housing for defining therewith a vertically oriented annular liquid mixing volume, inlet passageway means penetrating said housing and in registry with said annular mixing volume at a location intermediate upper and lower ends thereof for introducing liquid with multiple phases of different relative densities into said annular mixing volume for subsequent reception in said rotor means, said cascade having two of said plurality of centrifugal contactors providing first and second end stages with the remaining of said plurality of centrifugal contactors disposed therebetween, discharge conduit means in registry with the first end stage for conveying therefrom the heaviest phase of the liquid with multiple phases of different relative densities, further discharge conduit means in registry with the second end stage for conveying therefrom the lightest phase of the liquid with multiple phases of different relative densities, first and second further housing means each having wall portions defining chamber means therein, first passageway means in registry with the chamber means in the first further housing means and the annular mixing volume in the first end stage at a location in the annular mixing volume thereof overlying the location where the inlet passageway means are in registry with the annular mixing volume in the first end stage for conveying liquid from the annular mixing volume thereof to the chamber means in the first further housing means, second passageway means in registry with the chamber means in the second further housing means and the annular mixing volume in the second end stage at a location in the annular mixing volume thereof overlying the location where the inlet passageway means are in registry with the annular mixing volume in the second end stage for conveying liquid from the annular mixing volume thereof to the chamber means in the second further housing means, vertically oriented weir means disposed in each of the chamber means in the first and second further housing means for separating phases of the liquid received in the chamber means according to the relative densities of the liquid phases, conduit means in registry with the chamber means in the first further housing means for conveying therefrom liquid separated by said weir means in the first further housing means, further conduit means in registry with the second further housing means for conveying therefrom liquid separated by said weir means in the second further housing means, first further passageway means in registry with the annular mixing volume in the first end stage for conveying liquid therefrom to another centrifugal contactor of said remaining plurality of centrifugal contactors, and second further passageway means in registry with the annular mixing volume in the second end stage for conveying liquid therefrom to a further centrifugal contactor of said remaining plurality of centrifugal contactors.

7. A cascade as claimed in claim 6, wherein overflow conduit means interconnect the remaining centrifugal contactors at a location in the annular mixing volume in each of the remaining centrifugal contactors overlying the location where the inlet passageway means are in registry with each annular mixing volume, wherein said overflow passageway means are in a common horizontal plane, and wherein said first passageway means and said second passageway means are in essentially the same horizontal plane as said overflow conduit means.

8. A cascade of centrifugal contactors as claimed in claim 7, wherein said first further housing means has upper and lower wall portions respectively defining a top and base of the chamber means in the first further housing means, wherein said weir means in said first further housing means comprise vertically oriented partition means attached to said top of the chamber means and extend downwardly to a location spaced from and adjacent to the base of the chamber means for dividing the chamber means in the first further housing means into two vertically oriented compartments and for providing a passageway between the compartments at a location adjacent to said base of the chamber means and in a horizontal plane lower than the location of registry of said inlet passageway means in the annular mixing volume of said first end stage, wherein the first passageway means in registry with the chamber means in the first end stage is in the same horizontal plane as said overflow conduit means and is connected to one of said compartments at a location adjacent to the top of the chamber means, and wherein further discharge conduit means are in registry with the other of said compartments at a location adjacent to the top of the chamber means for conveying liquid from said other compartment.

9. A cascade of centrifugal contactors as claimed in claim 8, wherein the conduit means for conveying the heaviest phase from said first end stage is in registry with said one compartment at a location adjacent to the top of said chamber means.

10. A cascade of centrifugal contactors as claimed in claim 7, wherein said second further housing means has upper and lower wall portions respectively defining a top and base of the chamber means in said second further housing means, wherein said weir means in said second further housing means comprises vertically oriented partition means attached to said base of the chamber means and extending upwardly to a location spaced from and adjacent to said top of the chamber means for dividing the chamber means in said second further housing means into two vertically oriented compartments and for providing a passageway between the compartments at a location adjacent to said top of the chamber means, said passageway has a base portion disposed in a horizontal plane higher than that of a base portion of said second passageway means, wherein said second passageway means in registry with the chamber means in said second further housing means are connected to one of said compartments at a location adjacent to the top of the chamber means, wherein further conduit means are in registry with said one compartment at a location adjacent to the base of the chamber means and the annular mixing volume in said second end stage at a location intermediate the lower end of the rotor means therein and the location of registry of the inlet passageway means with the annular mixing volume of the second end stage, wherein discharge conduit means are in registry with the other of said compartments in said second further housing means at a location adjacent to the base of the chamber means for conveying liquid from said other compartment, and wherein said still further passageway means are in registry with the annular mixing volume in said second end stage at a location in a horizontal plane essentially common with the location of registry of said further conduit means and extend upwardly to said further centrifugal contactor at a location in the annular mixing volume of said further centrifugal contactor in a horizontal plane common with said overflow conduit means.

* * * * *